US011296843B2

(12) United States Patent
Liu et al.

(10) Patent No.: US 11,296,843 B2
(45) Date of Patent: Apr. 5, 2022

(54) METHOD AND DEVICE IN COMMUNICATION NODE FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 80 days.

(21) Appl. No.: 16/919,062

(22) Filed: Jul. 1, 2020

(65) Prior Publication Data
US 2020/0336262 A1 Oct. 22, 2020

Related U.S. Application Data

(63) Continuation of application No. PCT/CN2018/071684, filed on Jan. 6, 2018.

(51) Int. Cl.
*H04L 5/00* (2006.01)
*H04B 1/00* (2006.01)
(Continued)

(52) U.S. Cl.
CPC ......... *H04L 5/0046* (2013.01); *H04B 1/0003* (2013.01); *H04L 1/0026* (2013.01);
(Continued)

(58) Field of Classification Search
CPC ... H04L 5/0046; H04L 1/0026; H04L 1/1819; H04L 1/0045; H04L 1/0057;
(Continued)

(56) References Cited

U.S. PATENT DOCUMENTS

| 2016/0226643 A1 | 8/2016 | Mallik et al. |
| 2016/0269213 A1* | 9/2016 | Larsson ................ H04L 1/0003 |
| 2018/0227084 A1* | 8/2018 | Lu ......................... H04L 5/0035 |

FOREIGN PATENT DOCUMENTS

| CN | 101237241 A | 8/2008 |
| CN | 103078721 A | 5/2013 |

(Continued)

OTHER PUBLICATIONS

ISR received in application No. PCT/CN2018/071684 dated Jul. 19, 2018.
(Continued)

*Primary Examiner* — Steven H Nguyen

(57) ABSTRACT

The disclosure provides a method and a device in a communication node for wireless communications. The communication node first receives first information and then receives a first radio signal; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer. The disclosure reduces requirements on a buffer and reduces complexity.

20 Claims, 13 Drawing Sheets

(51) Int. Cl.
- *H04L 1/00* (2006.01)
- *H04L 1/18* (2006.01)
- *H04W 24/10* (2009.01)
- *H04W 72/04* (2009.01)
- *H04W 92/10* (2009.01)

(52) U.S. Cl.
CPC .......... *H04L 1/1819* (2013.01); *H04W 24/10* (2013.01); *H04W 72/0446* (2013.01); *H04W 72/0453* (2013.01); *H04W 72/0466* (2013.01); *H04W 92/10* (2013.01)

(58) Field of Classification Search
CPC ... H04L 1/1845; H04L 1/0041; H04L 1/0003; H04L 1/0009; H04L 5/003; H04L 5/0094; H04B 1/0003; H04W 24/10; H04W 72/0446; H04W 72/0453; H04W 72/0466; H04W 92/10
See application file for complete search history.

(56) References Cited

FOREIGN PATENT DOCUMENTS

| CN | 103248454 A | 8/2013 |
|----|-------------|--------|
| CN | 103259634 A | 8/2013 |
| CN | 106571900 A | 4/2017 |
| CN | 106899390 A | 6/2017 |

OTHER PUBLICATIONS

NTT Docomo,Inc"soft-buffer aspects for NR" 3GPP TSG RAN WG1 Meeting #90 RI-1713959, Aug. 25, 2017 (Aug. 25, 2017),sections 2 and 3.

NTT Docomo, Inc. Soft-buffer size and management 3GPP TSG RAN WG1 NR Ad-Hoc#2 R1-1711118, Jun. 30, 2017 (Jun. 30, 2017).

«3GPP TSG RAN WG1_RL1» Lenovo et.al R1-1710603"DL control signalling for CBG-based retransmission".

First Office Action of Chinese patent application No. 2018800833312, dated Jan. 25, 2022.

First Search Report of Chinese patent application No. 2018800833312, dated Jan. 19, 2022.

* cited by examiner

| $N'_{RE}$ | $\overline{N}'_{RE}$ | $n_{PRB}$ | $Q_m$ | TBS (bits) |
|---|---|---|---|---|
| $N'_{RE} \leq 9$ | 6 | 10 | 2 | 80 |
| $9 < N'_{RE} \leq 15$ | 12 | 8 | 2 | 128 |
| $15 < N'_{RE} \leq 30$ | 18 | 8 | 2 | 192 |
| $30 < N'_{RE} \leq 57$ | 42 | 6 | 2 | 336 |
| $57 < N'_{RE} \leq 90$ | 72 | 4 | 2 | 384 |
| $90 < N'_{RE} \leq 126$ | 108 | 2 | 2 | 288 |
| $126 < N'_{RE} \leq 150$ | 144 | 2 | 2 | 384 |
| $150 < N'_{RE}$ | 156 | 1 | 2 | 208 |

FIG. 7

| MCS Index $I_{MCS}$ | Modulation Order $Q_m$ | Target Code Rate R | Spectral Efficiency SE |
|---|---|---|---|
| 0 | 2 | R0 | SE0 |
| 1 | 2 | R1 | SE1 |
| 2 | 2 | R2 | SE2 |
| 3 | 2 | R3 | SE3 |
| 4 | 2 | R4 | SE4 |
| 5 | 2 | R5 | SE5 |
| 6 | 2 | R6 | SE6 |
| 7 | 2 | R7 | SE7 |
| 8 | 2 | R8 | SE8 |
| 9 | 2 | R9 | SE9 |
| 10 | 4 | R10 | SE10 |
| 11 | 4 | R11 | SE11 |
| 12 | 4 | R12 | SE12 |
| 13 | 4 | R13 | SE13 |
| 14 | 4 | R14 | SE14 |
| 15 | 4 | R15 | SE15 |
| 16 | 4 | R16 | SE16 |
| 17 | 6 | R17 | SE17 |
| 18 | 6 | R18 | SE18 |
| 19 | 6 | R19 | SE19 |
| 20 | 6 | R20 | SE20 |
| 21 | 6 | R21 | SE21 |
| 22 | 6 | R22 | SE22 |
| 23 | 6 | R23 | SE23 |
| 24 | 6 | R24 | SE24 |
| 25 | 6 | R25 | SE25 |
| 26 | 2 | | Reserved |
| 27 | 4 | | Reserved |
| 28 | 6 | | Reserved |
| 29 | 2 | | Reserved |
| 30 | 4 | | Reserved |
| 31 | 6 | | Reserved |

FIG. 10

| CQI Index | Modulation Scheme | Code Rate R | Spectral Efficiency SE |
|---|---|---|---|
| 0 | Out of Range | | |
| 1 | QPSK | R1 | SE1 |
| 2 | QPSK | R2 | SE2 |
| 3 | QPSK | R3 | SE3 |
| 4 | QPSK | R4 | SE4 |
| 5 | QPSK | R5 | SE5 |
| 6 | QPSK | R6 | SE6 |
| 7 | 16QAM | R7 | SE7 |
| 8 | 16QAM | R8 | SE8 |
| 9 | 16QAM | R9 | SE9 |
| 10 | 64QAM | R10 | SE10 |
| 11 | 64QAM | R11 | SE11 |
| 12 | 64QAM | R12 | SE12 |
| 13 | 64QAM | R13 | SE13 |
| 14 | 64QAM | R14 | SE14 |
| 15 | 64QAM | R15 | SE15 |

FIG. 11

METHOD AND DEVICE IN COMMUNICATION NODE FOR WIRELESS COMMUNICATION

CROSS REFERENCE TO RELATED APPLICATIONS

This application is a continuation of International Application No. PCT/CN2018/071684, filed Jan. 6, 2018, claims the priority benefit of International Patent Application No. PCT/CN2018/071684, filed on Jan. 6, 2018, the full disclosure of which is incorporated herein by reference.

BACKGROUND

Technical Field

The disclosure relates to transmission methods and devices in wireless communication systems, and in particular to a transmission method and device in non-territorial wireless communication.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary decided to conduct a study of New Radio (NR) (or 5G). The Work Item (WI) of NR was approved at the 3GPP RAN #75 plenary to standardize the NR.

In order to adapt to various application scenarios and meet different requirements, the 3GPP RAN #75 plenary approved a study item of Non-Terrestrial Network (NTN) under NR. This study item begins in R15 and initiates a WI in R16 to standardize relevant technologies. In NTN, transmission latency is far longer than in terrestrial networks.

SUMMARY

In networks with large transmission latency (for example, NTN), in order to guarantee data rate, an effective method is to increase the number of Hybrid Automatic Repeat Request (HARQ) processes or increase the length of Transmission Time Interval (TTI). However, on the other hand, while increasing the number of HARQ processes or increasing the length of TTI, a transport block requires a much larger buffer capability of UE.

In view of the problem that the buffer capability is limited in networks with large transmission latency, the disclosure provides a solution. It should be noted that the embodiments of the base station of the disclosure and the characteristics in the embodiments may be applied to the UE if no conflict is incurred, and vice versa. The embodiments of the disclosure and the characteristics in the embodiments may be mutually combined arbitrarily if no conflict is incurred.

The disclosure provides a method in a first-type communication node for wireless communication, wherein the method includes:
receiving first information; and
receiving a first radio signal.

Herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

In one embodiment, when processing the first radio signal, the first-type communication node determines, according to the first information, the number of bits that can be used for decoding of the first code block with combining, so that even if in the condition that the first radio signal is erroneously decoded, the first-type communication node still can judge whether to buffer the received bit or determine how many bits to buffer according to its own buffer capability, thereby reducing the requirements and complexity of buffer capability and providing flexibility of design for terminal equipment.

In one embodiment, it is allowed to buffer no soft bit or a few soft bits in the condition that the first radio signal is erroneously decoded, which increases the capability of dynamic sharing of a buffer between multiple HARQ processes and may greatly reduce the requirements on the buffer.

According to one aspect of the disclosure, the above method further includes:
receiving a first signaling.

Herein, the first signaling is used for indicating time-frequency resources occupied by the first radio signal, a number of resource elements included in the time-frequency resources occupied by the first radio signal is used for determining a number of bits included in the first code block, and the first signaling is transmitted through the air interface.

According to one aspect of the disclosure, the above method further includes:
receiving a second signaling; and
receiving a second radio signal.

Herein, the second signaling is used for determining X3 bit(s) in the first bit block, and the X3 bit(s) is(are) used for generating the second radio signal; the X2 bit(s) include(s) the X3 bit(s), or a Redundancy Version (RV) corresponding to the X3 bit(s) is equal to 0; the second signaling and the second radio signal are transmitted through the air interface.

In one embodiment, the approach of limiting the position of retransmitted bits or limiting the RV of retransmission during retransmission may ensure the performance of retransmission under the condition that the initial transmission buffers no received soft bit or buffers a few soft bits.

According to one aspect of the disclosure, the above method is characterized in that: the first radio signal belongs to a first HARQ process, and the first information is used for determining a number of bits in the first HARQ process that can be used for decoding with combining.

According to one aspect of the disclosure, the above method is characterized in that: the first bit block is obtained as a sequential output of channel coding of the first code block, the X2 bit(s) is(are) X2 consecutive bits in the first bit block, and a start position of the X2 bit(s) in the first bit block is predefined.

According to one aspect of the disclosure, the above method is characterized in that: the first information is used for determining a target Modulation Coding Scheme (MCS) set from P MCS sets, an MCS employed by the first radio signal is one MCS in the target MCS set, each of the P MCS sets includes a positive integer number of MCSs, any two of the P MCS sets are different, and the P is a positive integer greater than 1.

In one embodiment, through the design of a new MCS, the negative effect of loss in combining gain caused by buffering no received soft bit or buffering a few soft bits is reduced as much as possible.

According to one aspect of the disclosure, the above method further includes:

transmitting second information.

Herein, the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

The disclosure provides a method in a second-type communication node for wireless communication, wherein the method includes:

transmitting first information; and transmitting a first radio signal.

Herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

According to one aspect of the disclosure, the above method further includes:

transmitting a first signaling.

Herein, the first signaling is used for indicating time-frequency resources occupied by the first radio signal, a number of resource elements included in the time-frequency resources occupied by the first radio signal is used for determining a number of bits included in the first code block, and the first signaling is transmitted through the air interface.

According to one aspect of the disclosure, the above method further includes:

transmitting a second signaling; and transmitting a second radio signal.

Herein, the second signaling is used for determining X3 bit(s) in the first bit block, and the X3 bit(s) is(are) used for generating the second radio signal; the X2 bit(s) include(s) the X3 bit(s), or a redundancy version corresponding to the X3 bit(s) is equal to 0; the second signaling and the second radio signal are transmitted through the air interface.

According to one aspect of the disclosure, the above method is characterized in that: the first radio signal belongs to a first HARQ process, and the first information is used for determining a number of bits in the first HARQ process that can be used for decoding with combining.

According to one aspect of the disclosure, the above method is characterized in that: the first bit block is obtained as a sequential output of channel coding of the first code block, the X2 bit(s) is(are) X2 consecutive bits in the first bit block, and a start position of the X2 bit(s) in the first bit block is predefined.

According to one aspect of the disclosure, the above method is characterized in that: the first information is used for determining a target MCS set from P MCS sets, an MCS employed by the first radio signal is one MCS in the target MCS set, each of the P MCS sets includes a positive integer number of MCSs, any two of the P MCS sets are different, and the P is a positive integer greater than 1.

According to one aspect of the disclosure, the above method further includes:

receiving second information.

Herein, the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

The disclosure provides a first-type communication node for wireless communication, wherein the first-type communication node includes:

a first transceiver, to receive first information; and a first receiver, to receive a first radio signal.

Herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

According to one aspect of the disclosure, the above first-type communication node is characterized in that: the first transceiver further receives a first signaling; the first signaling is used for indicating time-frequency resources occupied by the first radio signal, a number of resource elements included in the time-frequency resources occupied by the first radio signal is used for determining a number of bits included in the first code block, and the first signaling is transmitted through the air interface.

According to one aspect of the disclosure, the above first-type communication node is characterized in that: the first transceiver further receives a second signaling; the first receiver receives a second radio signal; the second signaling is used for determining X3 bit(s) in the first bit block, and the X3 bit(s) is(are) used for generating the second radio signal; the X2 bit(s) include(s) the X3 bit(s), or a redundancy version corresponding to the X3 bit(s) is equal to 0; the second signaling and the second radio signal are transmitted through the air interface.

According to one aspect of the disclosure, the above first-type communication node is characterized in that: the first radio signal belongs to a first HARQ process, and the first information is used for determining a number of bits in the first HARQ process that can be used for decoding with combining.

According to one aspect of the disclosure, the above first-type communication node is characterized in that: the first bit block is obtained as a sequential output of channel coding of the first code block, the X2 bit(s) is(are) X2 consecutive bits in the first bit block, and a start position of the X2 bit(s) in the first bit block is predefined.

According to one aspect of the disclosure, the above first-type communication node is characterized in that: the first information is used for determining a target MCS set from P MCS sets, an MCS employed by the first radio signal is one MCS in the target MCS set, each of the P MCS sets includes a positive integer number of MCSs, any two of the P MCS sets are different, and the P is a positive integer greater than 1.

According to one aspect of the disclosure, the above first-type communication node is characterized in that: the first transceiver further transmits second information; the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

The disclosure provides a second-type communication node for wireless communication, wherein the second-type communication node includes:

a second transceiver, to transmit first information; and a first transmitter, to transmit a first radio signal.

Herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

According to one aspect of the disclosure, the above second-type communication node is characterized in that: the second transceiver further transmits a first signaling; the first signaling is used for indicating time-frequency resources occupied by the first radio signal, a number of resource elements included in the time-frequency resources occupied by the first radio signal is used for determining a number of bits included in the first code block, and the first signaling is transmitted through the air interface.

According to one aspect of the disclosure, the above second-type communication node is characterized in that: the second transceiver further transmits a second signaling; the first transmitter further transmits a second radio signal; the second signaling is used for determining X3 bit(s) in the first bit block, and the X3 bit(s) is(are) used for generating the second radio signal; the X2 bit(s) include(s) the X3 bit(s), or a redundancy version corresponding to the X3 bit(s) is equal to 0; the second signaling and the second radio signal are transmitted through the air interface.

According to one aspect of the disclosure, the above second-type communication node is characterized in that: the first radio signal belongs to a first HARQ process, and the first information is used for determining a number of bits in the first HARQ process that can be used for decoding with combining.

According to one aspect of the disclosure, the above second-type communication node is characterized in that: the first bit block is obtained as a sequential output of channel coding of the first code block, the X2 bit(s) is(are) X2 consecutive bits in the first bit block, and a start position of the X2 bit(s) in the first bit block is predefined.

According to one aspect of the disclosure, the above second-type communication node is characterized in that: the first information is used for determining a target MCS set from P MCS sets, an MCS employed by the first radio signal is one MCS in the target MCS set, each of the P MCS sets includes a positive integer number of MCSs, any two of the P MCS sets are different, and the P is a positive integer greater than 1.

According to one aspect of the disclosure, the above second-type communication node is characterized in that: the second transceiver further receives second information; the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

In one embodiment, the disclosure mainly has the following technical advantages.

The disclosure provides a method for a UE to flexibly utilize the buffer capability. Through this method, the UE may configure the size of a buffer to use or whether to buffer soft bits according to its own buffer capability when the received signal is erroneously decoded, thereby reducing the requirements and complexity of the buffer of the UE and providing possibilities of increasing HARQ processes or TTI for buffer-limited UEs or large-latency networks (for example, NTN).

The method in the disclosure improves link performances under the condition of reducing soft bits buffered or keeping no soft bit buffered, thereby ensuring the data rate of buffer-limited UEs or large-latency networks.

BRIEF DESCRIPTION OF TH E DRAWINGS

Other features, purposes and advantages of the disclosure will become more apparent from the detailed description of non-restrictive embodiments taken in conjunction with the following drawings.

FIG. 7 is a diagram illustrating a relationship between time-frequency resources occupied by a first radio signal and a number of bits included in a first code block according to one embodiment of the disclosure.

FIG. 10 is a diagram illustrating a target MCS set according to one embodiment of the disclosure.

FIG. 11 is a diagram illustrating a channel quality measured based on a first threshold according to one embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if there is no conflict.

Embodiment 1

Figure 1:
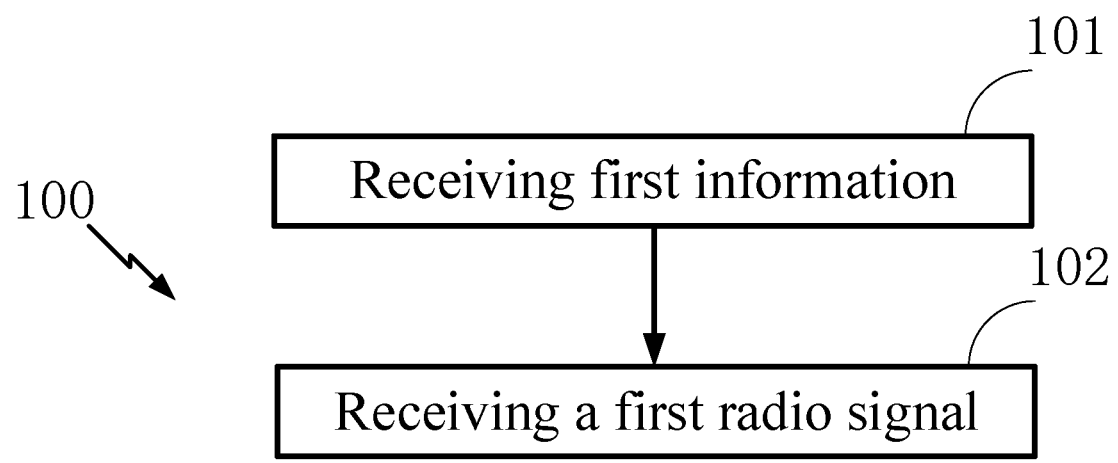
FIG. 1 is a flowchart of first information and a first radio signal according to one embodiment of the disclosure.

Embodiment 1 illustrates a flowchart of transmission of first information and a first radio signal according to one embodiment of the disclosure, as shown in FIG. 1. In FIG. 1, each box represents one step. In Embodiment 1, the first-type communication node in the disclosure first receives first information in S101 and then receives a first radio signal in S102; herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

In one embodiment, the method further includes:
receiving a first signaling.

Herein, the first signaling is used for indicating time-frequency resources occupied by the first radio signal, a number of resource elements included in the time-frequency resources occupied by the first radio signal is used for determining a number of bits included in the first code block, and the first signaling is transmitted through the air interface.

In one embodiment, the method further includes:
receiving a second signaling; and
receiving a second radio signal.

Herein, the second signaling is used for determining X3 bit(s) in the first bit block, and the X3 bit(s) is(are) used for generating the second radio signal; the X2 bit(s) includes(s) the X3 bit(s), or a Redundancy Version (RV) corresponding to the X3 bit(s) is equal to 0; the second signaling and the second radio signal are transmitted through the air interface.

In one embodiment, the first radio signal belongs to a first HARQ process, and the first information is used for determining a number of bits in the first HARQ process that can be used for decoding with combining.

In one embodiment, the first bit block is obtained as a sequential output of channel coding of the first code block, the X2 bit(s) is(are) X2 consecutive bits in the first bit block, and a start position of the X2 bit(s) in the first bit block is predefined.

In one embodiment, the first information is used for determining a target MCS set from P MCS sets, an MCS employed by the first radio signal is one MCS in the target MCS set, each of the P MCS sets includes a positive integer number of MCSs, any two of the P MCS sets are different, and the P is a positive integer greater than 1.

In one embodiment, the method further includes:
transmitting second information.

Herein, the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

In one embodiment, the first information is transmitted through a higher layer signaling.

In one embodiment, the first information is transmitted through a physical layer signaling.

In one embodiment, the first information includes partial or an entirety of one higher layer signaling.

In one embodiment, the first information includes partial or an entirety of one physical layer signaling.

In one embodiment, the first information is transmitted through a Physical Broadcast Channel (PBCH).

In one embodiment, the first information includes one or more fields in a Master Information Block (MIB).

In one embodiment, the first information is transmitted through a Downlink Shared Channel (DL-SCH).

In one embodiment, the first information is transmitted through a Physical Downlink Shared Channel (PDSCH).

In one embodiment, the first information includes one or more fields in one System Information Block (SIB).

In one embodiment, the first information includes one or more fields in Remaining System Information (RMSI).

In one embodiment, the first information includes partial or an entirety of one Radio Resource Control (RRC) signaling.

In one embodiment, the first information is broadcast.
In one embodiment, the first information is unicast.
In one embodiment, the first information is cell specific.
In one embodiment, the first information is UE specific.
In one embodiment, the first information is transmitted through a Physical Downlink Control Channel (PDCCH).

In one embodiment, the first information includes partial or all fields of one Downlink Control Information (DCI) signaling.

In one embodiment, the first information is transmitted through a PDCCH scheduling the first radio signal.

In one embodiment, the first information includes partial or all fields of a DCI signaling scheduling the first radio signal.

In one embodiment, the phrase that the first information is used for determining the X2 bit(s) refers that the first information is used by the first-type communication node to determine the X2 bit(s).

In one embodiment, the phrase that the first information is used for determining the X2 bit(s) refers that the first information indicates the X2 bit(s) directly.

In one embodiment, the phrase that the first information is used for determining the X2 bit(s) refers that the first information indicates the X2 bit(s) indirectly.

In one embodiment, the phrase that the first information is used for determining the X2 bit(s) refers that the first information indicates the X2 bit(s) explicitly.

In one embodiment, the phrase that the first information is used for determining the X2 bit(s) refers that the first information indicates the X2 bit(s) implicitly.

In one embodiment, the phrase that the first information is used for determining the X2 bit(s) refers that the first information is used for indicating a size of a soft buffer reserved for the first code block by the first-type communication node, and the size of the reserved soft buffer is used for determining the X2 bit(s).

In one embodiment, the phrase that the first information is used for determining the X2 bit(s) refers that the first information is used for indicating a size of a soft buffer reserved for the first code block by the first-type communication node, and the reserved soft buffer for the first code block can buffer X2 bit(s).

In one embodiment, the phrase that the first information is used for determining that the X1 bit(s) cannot be used for decoding of the first code block with combining when channel decoding fails refers that: the first information is used by the first-type communication node to directly determine that the X1 bit(s) cannot be used for decoding of the first code block with combining when channel decoding fails.

In one embodiment, the phrase that the first information is used for determining that the X1 bit(s) cannot be used for decoding of the first code block with combining when channel decoding fails refers that: the first information is used by the first-type communication node to indirectly determine that the X1 bit(s) cannot be used for decoding of the first code block with combining when channel decoding fails.

In one embodiment, the phrase that the first information is used for determining that the X1 bit(s) cannot be used for decoding of the first code block with combining when channel decoding fails refers that: the first information indicates explicitly that the X1 bit(s) cannot be used for decoding of the first code block with combining when channel decoding fails.

In one embodiment, the phrase that the first information is used for determining that the X1 bit(s) cannot be used for decoding of the first code block with combining when channel decoding fails refers that: the first information indicates implicitly that the X1 bit(s) cannot be used for decoding of the first code block with combining when channel decoding fails.

In one embodiment, the phrase that the first information is used for determining that the X1 bit(s) cannot be used for decoding of the first code block with combining when channel decoding fails refers that: the first information is used by the first-type communication node to determine that the buffer storing the X1 bit(s) can be flushed when channel decoding fails.

In one embodiment, the first radio signal is used for transmitting the first code block.

In one embodiment, the first radio signal carries the first code block.

In one embodiment, the first radio signal carries the first code block only.

In one embodiment, the first radio signal carries a Code Block (CB) other than the first code block.

In one embodiment, the first radio signal is transmitted through a Downlink Shared Channel (DL-SCH).

In one embodiment, the first radio signal is transmitted through a Physical Downlink Shared Channel (PDSCH).

In one embodiment, the X1 bit(s) is(are) processed sequentially through rate matching, concatenation, scrambling, modulation mapper, layer mapper, precoding, resource element mapper and OFDM baseband signal generation to obtain the first radio signal.

In one embodiment, the X1 bit(s) is(are) processed sequentially through rate matching and concatenation with other bits to obtain a first bit block, and the first bit block is processed sequentially through scrambling, modulation mapper, layer mapper, precoding, resource element mapper and OFDM baseband signal generation to obtain the first radio signal.

In one embodiment, a bit other than the X1 bit(s) is also used for generating the first radio signal.

In one embodiment, the first radio signal is generated by the X1 bit(s) only.

In one embodiment, the first radio signal is generated by the X1 bit(s) and a bit other than the X1 bit(s).

In one embodiment, the first radio signal is an initial transmission of a Transport Block (TB) in one HARQ process.

In one embodiment, the first radio signal is a retransmission of a Transport Block (TB) in one HARQ process.

In one embodiment, the first radio signal is an initial transmission of a CB in one HARQ process.

In one embodiment, the first radio signal is a retransmission of a CB in one HARQ process.

In one embodiment, the first radio signal is a retransmission of one or more Code Block Groups (CBGs) in one HARQ process.

In one embodiment, the X1 is less than a number of bits in the first bit block.

In one embodiment, the X1 is equal to a number of bits in the first bit block.

In one embodiment, the X1 bit(s) include(s) all bits in the first bit block.

In one embodiment, the X1 bit(s) include(s) partial bits in the first bit block only.

In one embodiment, the first bit block is obtained as a sequential output of channel coding of the first code block, and the X1 bit(s) is(are) X1 consecutive bit(s) in the first bit block.

In one embodiment, the first bit block is obtained as a sequential output of channel coding of the first code block, and the X1 bit(s) is(are) X1 discrete bit(s) in the first bit block.

In one embodiment, the first bit block is obtained as a sequential output of channel coding of the first code block, and the X1 bit(s) is(are) X1 consecutive bit(s) starting from the initial bit of the first bit block in the first bit block.

In one embodiment, the first bit block is obtained as a sequential output of channel coding of the first code block, and the X1 bit(s) is(are) X1 consecutive bit(s) starting from the non-initial bit of the first bit block in the first bit block.

In one embodiment, the first code block is one CB.

In one embodiment, the first code block is one of CBs obtained after one TB is processed sequentially through Cyclic Redundancy Check (CRC) addition, code block segmentation or CB CRC addition.

In one embodiment, the first code block is obtained after one TB is processed through CRC addition.

In one embodiment, the processing of soft buffer or soft combining for the first code block transmitted in the first radio signal is different from the processing for another CB transmitted in one radio signal other than the first radio signal.

In one embodiment, a code block in one radio signal other than the first radio signal is different from the first code block in processing of soft buffer or soft combining.

In one embodiment, the channel coding is Low Density Parity Check Code (LDPC) coding.

In one embodiment, the channel coding is Turbo coding.

In one embodiment, the channel coding is Polar coding.

In one embodiment, the channel coding is convolutional coding.

In one embodiment, the channel coding is LDPC coding in Section 5.3.2 in 3GPP TS38.212 (v2.0.0).

In one embodiment, the channel coding is polar coding in Section 5.3.1 in 3GPP TS38.212 (v2.0.0).

In one embodiment, the channel coding is turbo coding in Section 5.1.3.2 in 3GPP TS36.212.

In one embodiment, the channel coding is convolutional coding in Section 5.1.3.1 in 3GPP TS36.212.

In one embodiment, the phrase that the channel coding fails refers that a CRC check does not pass when performing channel decoding of the first radio signal.

In one embodiment, the phrase that the channel coding fails refers that the first radio signal is not received.

In one embodiment, the X2 is not greater than the X1.

In one embodiment, the X2 is not greater than the X1, and each of the X2 bit(s) belongs to the X1 bit(s).

In one embodiment, the X2 is not greater than the X1, and one of the X2 bit(s) does not belong to the X1 bit(s).

In one embodiment, the X2 is greater than the X1.

In one embodiment, the X2 is greater than the X1, and each of the X1 bit(s) belongs to the X2 bit(s).

In one embodiment, the X2 is greater than the X1, and one of the X1 bit(s) does not belong to the X2 bit(s).

In one embodiment, the X2 is not greater than a number of bits included in the first bit block.

In one embodiment, the X2 bit(s) include(s) all bits in the first bit block.

In one embodiment, the X2 bit(s) include(s) partial bits in the first bit block only.

In one embodiment, the first bit block is obtained as a sequential output of channel coding of the first code block, and the X2 bit(s) is(are) X2 consecutive bit(s) in the first bit block.

In one embodiment, the first bit block is obtained as a sequential output of channel coding of the first code block, and the X2 bit(s) is(are) X2 discrete bit(s) in the first bit block.

In one embodiment, the first bit block is obtained as a sequential output of channel coding of the first code block, and the X2 bit(s) is(are) X2 consecutive bit(s) starting from the initial bit of the first bit block in the first bit block.

In one embodiment, the first bit block is obtained as a sequential output of channel coding of the first code block, and the X2 bit(s) is(are) X2 consecutive bit(s) starting from the non-initial bit of the first bit block in the first bit block.

In one embodiment, the first bit block is the bits in a circular buffer after the first code block experiences LDPC coding.

In one embodiment, the combining coding is channel coding based on soft combining.

In one embodiment, the combining coding is channel coding based on chase combining.

In one embodiment, the combining coding is channel coding based on Incremental Redundancy (IR).

In one embodiment, the combining coding is channel coding based on IR and chase combining.

In one embodiment, the air interface is wireless.

In one embodiment, the air interface includes a wireless channel.

In one embodiment, the air interface is an interface between the second-type communication node and the first-type communication node.

In one embodiment, the air interface is a Uu interface.

In one embodiment, the method further includes:

transmitting a third information.

Herein, the third information is used for indicating a buffer capability of soft bits of a transmitter of the third information.

Embodiment 2

Figure 2:
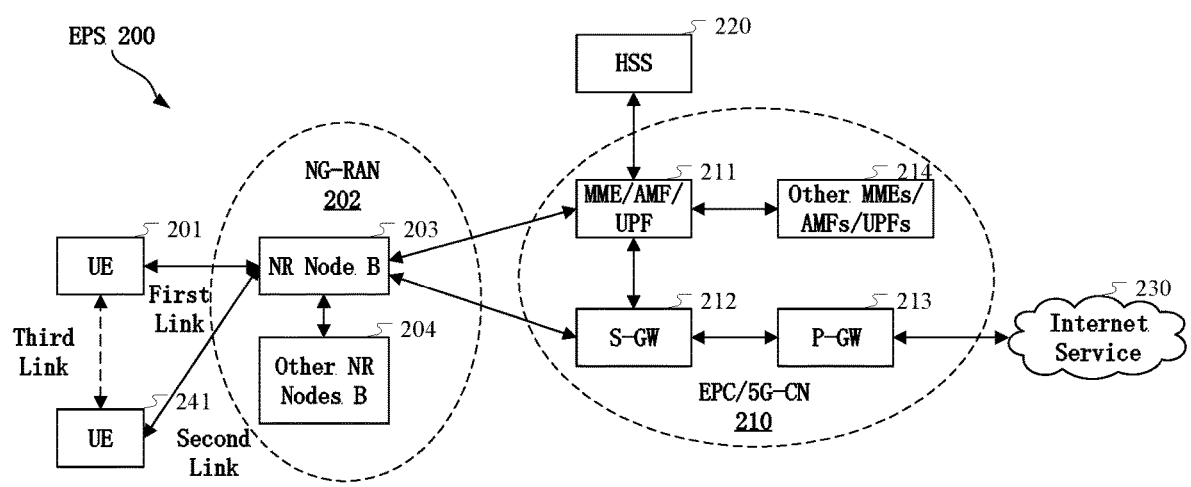
FIG. 2 is a diagram illustrating a network architecture according to one embodiment of the disclosure.

Embodiment 2 illustrates a diagram for a network architecture, as shown in FIG. 2. FIG. 2 is a diagram illustrating a network architecture 200 of NR 5G Long-Term Evolution (LTE) and Long-Term Evolution Advanced (LTE-A) systems. The NR 5G or LTE network architecture 200 may be called an Evolved Packet System (EPS) 200. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes a NR node (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. In NTN networks, the gNB 203 may be a satellite, an aircraft or a ground base station relayed via a satellite. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first-type communication node in the disclosure.

In one embodiment, the UE 201 supports NTN transmission.

In one embodiment, the gNB 203 corresponds to the second-type communication node in the disclosure.

In one embodiment, the gNB 203 supports NTN transmission.

Embodiment 3

Figure 3:
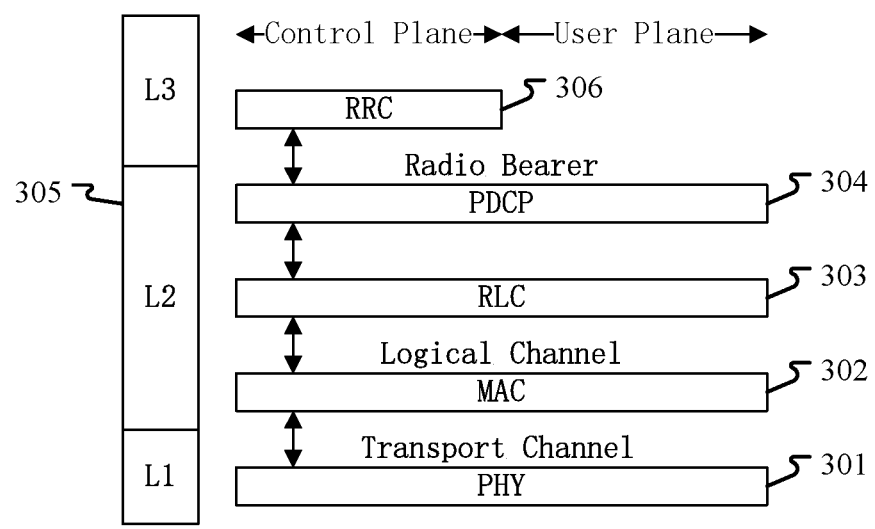
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane and a control plane. In FIG. 3, the radio protocol architecture of a first-type communication node (UE) and a second-type communication node (gNB or eNB or satellite or aircraft in NTN) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first-type communication node and the second-type communication node over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the second-type communication node on the network side. Although not shown in FIG. 3, the first-type communication node may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for first-type communication node handover between second-type communication nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the first-type communication node and the second-type communication node is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first-type communication node in the disclosure.

In one embodiment, the radio protocol architecture shown in FIG. 3 is applicable to the second-type communication node in the disclosure.

In one embodiment, the first information in the disclosure is generated on the RRC 306.

In one embodiment, the first information in the disclosure is generated on the MAC 302.

In one embodiment, the first information in the disclosure is generated on the PHY 301.

In one embodiment, the first signaling in the disclosure is generated on the RRC 306.

In one embodiment, the first signaling in the disclosure is generated on the PHY 301.

In one embodiment, the first radio signal in the disclosure is generated on the RRC 306.

In one embodiment, the first radio signal in the disclosure is generated on the MAC 302.

In one embodiment, the first radio signal in the disclosure is generated on the PHY 301.

In one embodiment, the second radio signal in the disclosure is generated on the RRC 306.

In one embodiment, the second radio signal in the disclosure is generated on the MAC 302.

In one embodiment, the second radio signal in the disclosure is generated on the PHY 301.

In one embodiment, the second information in the disclosure is generated on the RRC 306.

In one embodiment, the second information in the disclosure is generated on the MAC 302.

In one embodiment, the second information in the disclosure is generated on the PHY 301.

In one embodiment, the second signaling in the disclosure is generated on the RRC 306.

In one embodiment, the second signaling in the disclosure is generated on the PHY 301.

Embodiment 4

Figure 4:
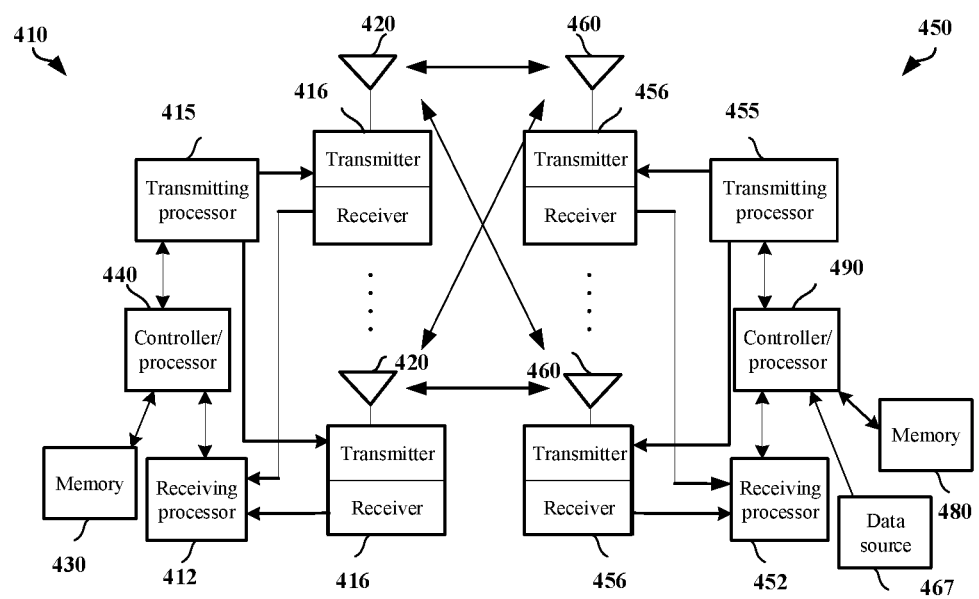
FIG. 4 is a diagram illustrating a first-type communication node and a second-type communication node according to one embodiment of the disclosure.

Embodiment 4 illustrates a diagram of a base station and a given UE according to the disclosure, as shown in FIG. 4. FIG. 4 is a block diagram of a gNB/eNB 410 in communication with a UE 450 in an access network.

The UE 450 includes a controller/processor 490, a memory 480, a receiving processor 452, a transmitter/receiver 456, a transmitting processor 455 and a data source 467, the transmitter/receiver 456 including an antenna 460. The data source 467 provides a higher-layer packet to the controller/processor 490. The controller/processor 490 provides header compression/decompression, encryption/deencryption, packet segmentation and reordering, multiplexing and de-multiplexing between a logical channel and a transport channel, to implement L2 protocols between the user plane and the control plane. The higher-layer packet may include data or control information, for example, DL-SCH or UL-SCH. The transmitting processor 455 performs various signal transmitting processing functions used for L1 layer (that is, PHY), including encoding, interleaving, scrambling, modulation, power control/allocation, precoding, and generation of physical layer control signalings. The receiving processor 452 performs various signal receiving processing functions used for L1 layer (that is, PHY), including decoding, de-interleaving, descrambling, demodulation, de-precoding, and extraction of physical layer control signalings, etc. The transmitter 456 is configured to convert the baseband signal provided by the transmitting processor 455 into a radio-frequency signal and transmit the radio-frequency signal via the antenna 460. The receiver 456 converts a radio-frequency signal received via the corresponding antenna 460 into a baseband signal and provides the baseband signal to the receiving processor 452.

The base station 410 includes a controller/processor 440, a memory 430, a receiving processor 412, transmitter/receiver 416 and a transmitting processor 415, the transmitter/receiver 416 including an antenna 420. A higher-layer packet is provided to the controller/processor 440. The controller/processor 440 provides header compression/decompression, encryption/deencryption, packet segmentation and reordering, multiplexing and de-multiplexing between a logical channel and a transport channel, to implement L2 protocols between the user plane and the control plane. The higher-layer packet may include data or control information, for example, DL-SCH or UL-SCH. The transmitting processor 415 performs various signal transmitting processing functions used for L1 layer (that is, PHY), including encoding, interleaving, scrambling, modulation, power control/allocation, precoding, and generation of physical layer control signalings. The receiving processor 412 performs various signal receiving processing functions used for L1 layer (that is, PHY), including decoding, de-interleaving, descrambling, demodulation, de-precoding, and extraction of physical layer control signalings, etc. The transmitter 416 is configured to convert the baseband signal provided by the transmitting processor 415 into a radio-frequency signal and transmit the radio-frequency signal via the antenna 420. The receiver 416 converts a radio-frequency signal received via the corresponding antenna 420 into a baseband signal and provides the baseband signal to the receiving processor 412.

In Downlink (DL) transmission, a higher-layer packet (for example, a higher-layer packet carried by the first radio signal and the second radio signal in the disclosure) is provided to the controller/processor 440. The controller/processor 440 provides a function of L2 layer. In DL transmission, the controller/processor 440 provides header compression, encryption, packet segmentation and reordering, multiplexing between a logical channel and a transport channel, and a radio resource allocation for the UE 450 based on various priorities. The controller/processor 440 is also in charge of HARQ operation, retransmission of a lost packet, and a signaling to the UE 450, for example, the first information, the first signaling and the second signaling in the disclosure are all generated in the controller/processor 440. The transmitting processor 415 performs various signal processing functions used for L1 layer (that is, physical layer). The signal processing functions include encoding and interleaving so as to ensure FEC (Forward Error Correction) at the UE 450 side and modulation of baseband signals corresponding to different modulation schemes (i.e., BPSK, QPSK). The modulated signals are divided into parallel streams. Each of the parallel streams is mapped into corresponding multi-carrier subcarriers and/or multi-carrier symbols and then is mapped to an antenna 420 by the transmitting processor 415 via the transmitter 416 to transmit in form of Radio Frequency (RF) signal. Corresponding channels of the first signaling, the second signaling and the first information in the disclosure in PHY are mapped to a target air interface resource via transmitting processor 415 and then mapped to the antenna 420 via the transmitter 416 to transmit in form of RF signal. At the receiving side, every receiver 456 receives an RF signal via the corresponding antenna 460. Every receiver 456 recovers baseband information modulated to the RF carrier and provides the baseband information to the receiving processor 452. The receiving processor 452 performs signal receiving processing functions of L1 layer. The signal receiving processing functions include receptions of physical signals of the first signaling, the second signaling and the first information in the disclosure, multicarrier symbols in the multicarrier symbol streams are demodulated corresponding to different modulation schemes (for example, BPSK and QPSK), and then are decoded and deinterleaved to recover the data or control signals on a physical channel transmitted by the gNB 410, then the data and control signals are provided to the controller/processor 490. The controller/processor 490 implements functions of L2 layer, and the controller/processor 490 interprets the first information, the first radio signal and the second radio signal in the disclosure. The controller/processor may be connected to the memory 480 that stores program codes and data. The memory 480 may be a computer readable medium.

In Uplink (UL) transmission, the data source 467 provides relevant configuration data of signals to the controller/processor 490. The data source 467 illustrates all protocol layers above the L2 layer. The controller/processor 490 provides header compression, encryption, packet segmentation and reordering, and multiplexing between a logical channel and a transport channel based on configurations of the gNB 410 so as to provide the functions of L2 layer used for the control plane and user plane. The controller/processor 490 is also in charge of HARQ operation, retransmission of lost packets, and signalings to the gNB 410 (including the second information in the disclosure). The transmitting processor 455 performs various signal transmitting processing functions used for L1 layer (that is, PHY). The signal transmitting processing functions include encoding, modulating, etc.; the modulated symbols are split into parallel streams and each stream is mapped to corresponding multicarrier subcarriers and/or multicarrier symbols, and then the transmitting processor 455 maps it to the antenna 460 via the transmitter 456 to transmit out in form of RF signal. Physical layer signals (including the physical layer signal corresponding to the second information in the disclosure) are generated at the processor 455. The receiver 416 receives an RF signal via the corresponding antenna 420; each receiver 416 recovers the baseband information modulated onto the RF carrier and provides the baseband information to the receiving processor 412. The receiving processor 412 performs various signal receiving processing functions used for L1 layer, including receiving physical layer signals of the second information in the disclosure; the signal receiving processing functions include acquiring multicarrier symbol streams, and then demodulating the multicarrier symbols in the multicarrier symbol streams corresponding to different modulation schemes (for example, BPSK and QPSK), and then decoding to recover the data or control signals on a physical channel transmitted by the UE 450, then the data and control signals are provided to the controller/processor 440. The controller/processor 440 implements functions of L2 layer. The controller/processor may be connected to the buffer 430 that stores program codes and data. The buffer 430 may be a computer readable medium.

In one embodiment, the UE 450 corresponds to the first-type communication node in the disclosure.

In one embodiment, the gNB 410 corresponds to the second-type communication node in the disclosure.

In one embodiment, the UE 450 includes at least one processor and at least one memory. The at least one memory includes computer program codes. The at least one memory and the computer program codes are configured to be used in collaboration with the at least one processor. The UE 400 at least receives first information and receives a first radio signal; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

In one embodiment, the UE 450 includes a memory that stores a computer readable instruction program. The computer readable instruction program generates an action when executed by at least one processor. The action includes: receiving first information and receiving a first radio signal; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

In one embodiment, the base station 400 includes at least one processor and at least one memory. The at least one memory includes computer program codes. The at least one memory and the computer program codes are configured to be used in collaboration with the at least one processor. The base station 400 at least transmits first information and transmits a first radio signal; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

In one embodiment, the base station 400 includes a memory that stores a computer readable instruction program. The computer readable instruction program generates an action when executed by at least one processor. The action includes: transmitting first information and transmitting a first radio signal; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

In one embodiment, the receiver 456 (including antenna 460), the receiving processor 452 and the controller/processor 490 are used for receiving the first information in the disclosure.

In one embodiment, the receiver 456 (including antenna 460), the receiving processor 452 and the controller/processor 490 are used for receiving the first radio signal in the disclosure.

In one embodiment, the receiver 456 (including antenna 460), the receiving processor 452 and the controller/processor 490 are used for receiving the first signaling in the disclosure.

In one embodiment, the receiver 456 (including antenna 460), the receiving processor 452 and the controller/processor 490 are used for receiving the second signaling in the disclosure.

In one embodiment, the receiver 456 (including antenna 460), the receiving processor 452 and the controller/processor 490 are used for receiving the second radio signal in the disclosure.

In one embodiment, the transmitter 456 (including antenna 460), the transmitting processor 455 and the controller/processor 490 are used for transmitting the second information in the disclosure.

In one embodiment, the transmitter 416 (including antenna 420), the transmitting processor 415 and the controller/processor 440 are used for transmitting the first information in the disclosure.

In one embodiment, the transmitter 416 (including antenna 420), the transmitting processor 415 and the controller/processor 440 are used for transmitting the first radio signal in the disclosure.

In one embodiment, the transmitter 416 (including antenna 420), the transmitting processor 415 and the controller/processor 440 are used for transmitting the first signaling in the disclosure.

In one embodiment, the transmitter 416 (including antenna 420), the transmitting processor 415 and the controller/processor 440 are used for transmitting the second signaling in the disclosure.

In one embodiment, the transmitter 416 (including antenna 420), the transmitting processor 415 and the controller/processor 440 are used for transmitting the second radio signal in the disclosure.

In one embodiment, the receiver 416 (including antenna 420), the receiving processor 412 and the controller/processor 440 are used for receiving the second information in the disclosure.

Embodiment 5

Figure 5:
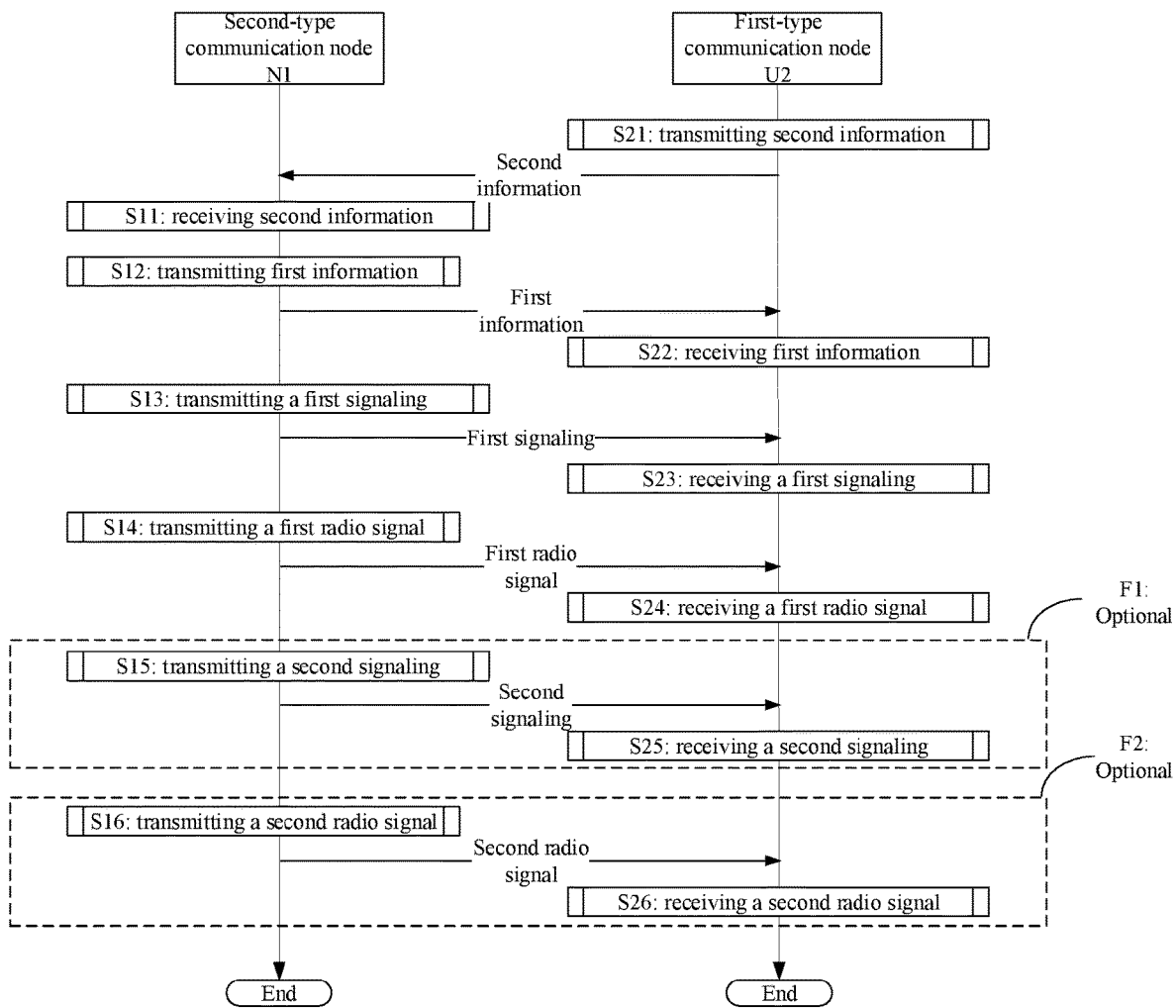
FIG. 5 is a flowchart of transmission of a first radio signal according to one embodiment of the disclosure.

Embodiment 5 illustrates a flowchart of transmission of a radio signal according to one embodiment of the disclosure, as shown in FIG. 5. In FIG. 5, a second-type communication node N1 is a maintenance base station for a serving cell of a first-type communication node U2, and steps in a dash-line box are optional.

The second-type communication node N1 receives second information in S11, transmits first information in S12, transmits a first signaling in S13, transmits a first radio signal in S14, transmits a second signaling in S15 and transmits a second radio signal in S16.

The first-type communication node U2 transmits second information in S21, receives first information in S22, receives a first signaling in S23, receives a first radio signal in S24, receives a second signaling in S25 and receives a second radio signal in S26.

In Embodiment 5, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface; the first signaling is used for indicating time-frequency resources occupied by the first radio signal, a number of resource elements included in the time-frequency resources occupied by the first radio signal is used for determining a number of bits included in the first code block, and the first signaling is transmitted through the air interface; the second signaling is used for determining X3 bit(s) in the first bit block, and the X3 bit(s) is(are) used for generating the second radio signal; the X2 bit(s) include(s) the X3 bit(s), or a redundancy version corresponding to the X3 bit(s) is equal to 0; the second signaling and the second radio signal are transmitted through the air interface; the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

In one embodiment, the first radio signal belongs to a first HARQ process, and the first information is used for determining a number of bits in the first HARQ process that can be used for decoding with combining.

In one embodiment, the first bit block is obtained as a sequential output of channel coding of the first code block, the X2 bit(s) is(are) X2 consecutive bits in the first bit block, and a start position of the X2 bit(s) in the first bit block is predefined.

In one embodiment, the first information is used for determining a target MCS set from P MCS sets, an MCS employed by the first radio signal is one MCS in the target MCS set, each of the P MCS sets includes a positive integer number of MCSs, any two of the P MCS sets are different, and the P is a positive integer greater than 1.

In one embodiment, the first signaling is further used for indicating an MCS employed by the first radio signal, and the MCS employed by the first radio signal is also used for determining a number of bits included in the first code block.

In one embodiment, the first signaling is further used for indicating spatial resources occupied by the first radio signal, and the spatial resources occupied by the first radio signal are also used for determining a number of bits included in the first code block.

In one embodiment, the first signaling is transmitted through a PDCCH.

In one embodiment, the first signaling is all or partial fields in one DIC signaling.

In one embodiment, the first signaling is one physical layer signaling.

In one embodiment, the first signaling is one higher layer signaling.

In one embodiment, the first signaling is all or partial Information Elements (IE2) in one RRC signaling.

In one embodiment, the first signaling is one signaling indicating time-frequency resources that cannot be occupied by the first radio signal.

In one embodiment, the first signaling indicates directly time-frequency resources occupied by the first radio signal.

In one embodiment, the first signaling indicates indirectly time-frequency resources occupied by the first radio signal.

In one embodiment, the first signaling indicates explicitly time-frequency resources occupied by the first radio signal.

In one embodiment, the first signaling indicates implicitly time-frequency resources occupied by the first radio signal.

In one embodiment, the first information is one part of the first signaling.

In one embodiment, the first signaling carries the first information.

In one embodiment, the first information is one field in the first signaling.

In one embodiment, the first information is carried by one signaling other than the first signaling.

In one embodiment, a transmission start of the second signaling is later than a transmission start of the first radio signal.

In one embodiment, a transmission start of the second signaling is later than a transmission end of the first radio signal.

In one embodiment, the second signaling is transmitted through a PDCCH.

In one embodiment, the second signaling is all or partial fields in one DCI signaling.

In one embodiment, the second signaling is one physical layer signaling.

In one embodiment, the second signaling is one higher layer signaling.

In one embodiment, the second signaling is all or partial IEs in one RRC signaling.

In one embodiment, the second signaling is one signaling indicating time-frequency resources that cannot be occupied by the first radio signal.

In one embodiment, the second signaling is used by the first-type communication node to determine the X3 bit(s) in the first bit block.

In one embodiment, the second signaling is used by the first-type communication node to indirectly determine the X3 bit(s) in the first bit block.

In one embodiment, the second signaling is used by the first-type communication node to directly determine the X3 bit(s) in the first bit block.

In one embodiment, the second signaling indicates explicitly the X3 bit(s) in the first bit block.

In one embodiment, the second signaling indicates implicitly the X3 bit(s) in the first bit block.

In one embodiment, the first information is used by the first-type communication node to directly determine the first threshold.

In one embodiment, the first information is used by the first-type communication node to indirectly determine the first threshold.

In one embodiment, the first information indicates explicitly the first threshold.

In one embodiment, the first information indicates implicitly the first threshold.

In one embodiment, the second information is used by the first-type communication node to indicate a channel quality measured based on the first threshold.

In one embodiment, the second information indicates directly a channel quality measured based on the first threshold.

In one embodiment, the second information indicates indirectly a channel quality measured based on the first threshold.

In one embodiment, the second information indicates explicitly a channel quality measured based on the first threshold.

In one embodiment, the second information indicates implicitly a channel quality measured based on the first threshold.

In one embodiment, the second information includes a Channel Quality Indicator (CQI).

In one embodiment, the second information is partial or an entirety of one Uplink Control Information (UCI) signaling.

In one embodiment, the second information is transmitted through a Physical Uplink Shared Channel (PUSCH).

In one embodiment, the second information is transmitted through an Uplink Shared Channel (UL-SCH).

In one embodiment, the second information is transmitted through a Physical Uplink Control Channel (PUCCH).

In one embodiment, the second information is transmitted through one physical layer signaling.

In one embodiment, the second information is transmitted through one higher layer signaling.

In one embodiment, the phrase that the second information is used to indicate a channel quality measured based on the first threshold refers that: the first-type communication node assumes that one downlink transport block, employing an MCS and TBS (Transport Block Size) indicated by the second information, can be received at a block rate error not exceeding the first threshold.

Embodiment 6

Figure 6:
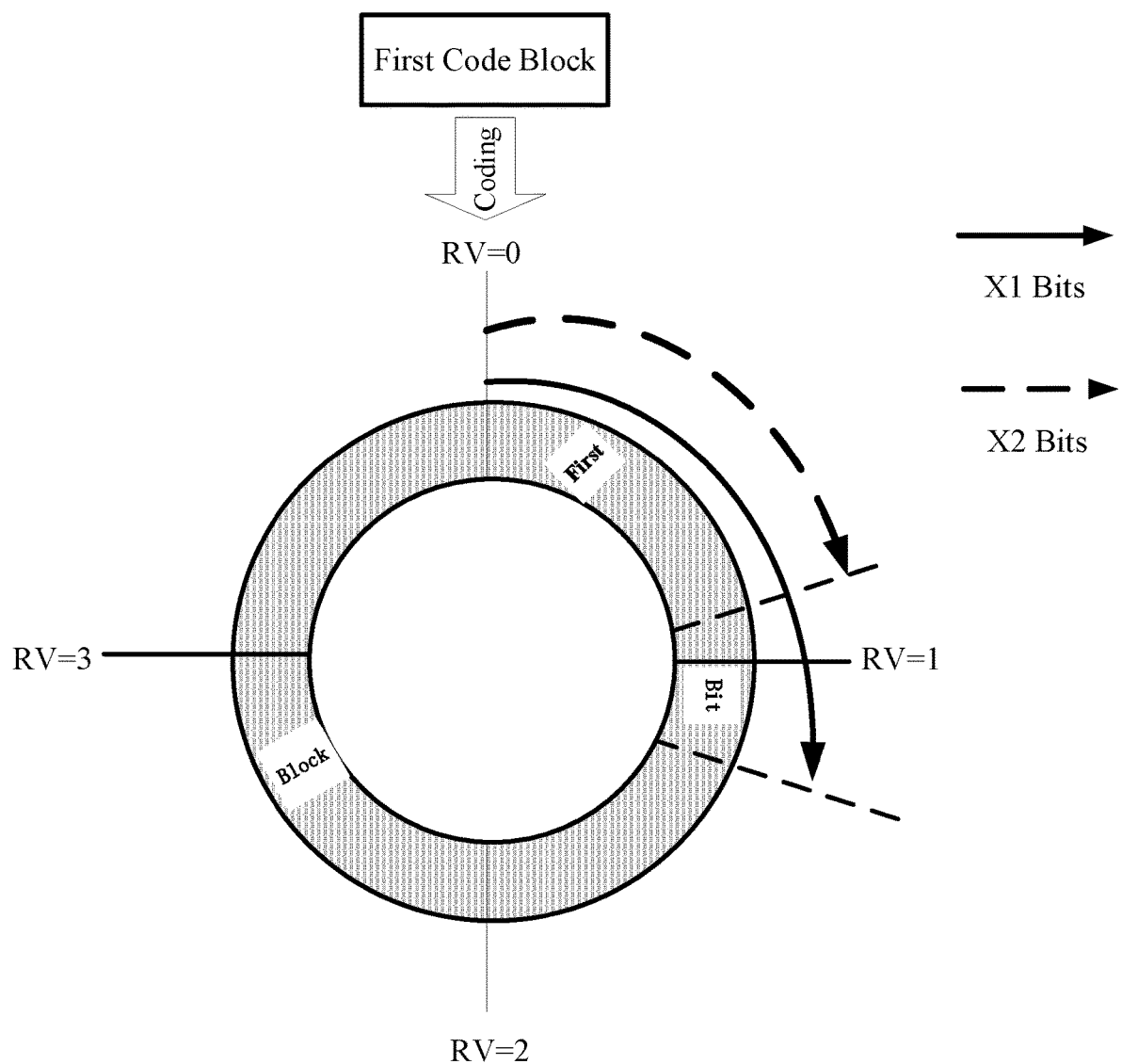
FIG. 6 is a diagram illustrating a relationship among a first bit block, X1 bits and X2 bits according to one embodiment of the disclosure.

Embodiment 6 illustrates a diagram of a relationship among a first bit block, X1 bits and X2 bits according to one embodiment of the disclosure, as shown in FIG. 6. In FIG. 6, a circular area filled with slashes represents a first bit block, an area indicted by a solid arrow in the circular area represents X1 bits, and an area indicated by a dashed arrow in the circular area represents X2 bits.

In Embodiment 6, only X1 bits in a first bit block are used for generating the first radio signal in the disclosure, the first bit block is obtained as an output of channel coding of a first code block, the first code block includes a positive integer number of bits, and the first bit block includes a positive integer number of bits; when channel decoding fails, at least X2 bits in the first bit block can be used for decoding of the first code block with combining, the first information in the disclosure is used for determining the X2 bits, and the X2 is a positive integer; or, the first information is used for determining that the X1 bits cannot be used for decoding of the first code block with combining when channel decoding fails; the X2 bits are X2 consecutive bits in the first bit block, and a start position of the X2 bits in the first bit block is predefined.

In one embodiment, the phrase that a start position of the X2 bits in the first bit block is predefined refers that: a start position of the X2 bits in the first bit block is a start position determined by a given RV in the first bit block.

In one embodiment, the phrase that a start position of the X2 bits in the first bit block is predefined refers that: a start position of the X2 bits in the first bit block is a start position determined by a given RV that is equal to 0 in the first bit block.

In one embodiment, the phrase that a start position of the X2 bits in the first bit block is predefined refers that: a start position of the X2 bits in the first bit block is a position of an initial bit determined by a given RV in the first bit block according to the computation in Section 5.4.2 in 3GPP TS38.212 (v2.0.0).

In one embodiment, the phrase that a start position of the X2 bits in the first bit block is predefined refers that: a start position of the X2 bits in the first bit block is a position of an initial bit determined by a given RV that is equal to 0 in the first bit block according to the computation in Section 5.4.2 in 3GPP TS38.212 (v2.0.0).

Embodiment 7

Embodiment 7 illustrates a diagram of a relationship between time-frequency resources occupied by a first radio signal and a number of bits included in a first code block according to one embodiment of the disclosure, as shown in FIG. 7. In FIG. 7, $N'_{RE}$ in the first column represents a number of resource elements that each PRB (Physical Resource Block) in time-frequency resources occupied by the first radio signal includes in one slot, the $\overline{N}'_{RE}$ in the second column represents a quantified number of resource elements for the $N'_{RE}$, the $n_{PRB}$ in the third column represents a number of PRBs in frequency domain in time-frequency resources occupied by the first radio signal, the fourth column represents a modulation order employed by the first radio signal, and the fifth column represents a number of bits included in the first code block. In Embodiment 7, a number of resource elements included in the time-frequency resources occupied by the first radio signal is used for determining a number of bits included in the first code block in the disclosure.

In one embodiment, time-frequency resources occupied by the first radio signal include a positive integer number of Resource Elements (REs).

In one embodiment, one RE occupies one Orthogonal Frequency Division Multiplexing (OFDM) subcarrier in frequency domain and occupies one OFDM multicarrier symbol in time domain, wherein one multicarrier symbol includes a Cyclic Prefix (CP).

In one embodiment, a number of REs included in the time-frequency resources occupied by the first radio signal is used by the first-type communication node to determine a number of bits included in the first code block.

In one embodiment, a number of REs included in the time-frequency resources occupied by the first radio signal is used by the first-type communication node to determine a number of bits included in the first code block based on a specific mapping relationship.

In one embodiment, a number of REs included in the time-frequency resources occupied by the first radio signal is used by the first-type communication node to determine a number of bits included in the first code block based on a specific computing rule.

In one embodiment, a number of REs included in the time-frequency resources occupied by the first radio signal is used for determining a reference number of REs; the reference number of REs, the MCS used by the first radio signal and the occupied layer number are used for determining a total number of bits included in the first transport block, and the first transport block is processed through transport block CRC addition, code block segmentation and code block CRC addition to determine a number of bits included in the first code block.

In one embodiment, a number of REs included in the time-frequency resources occupied by the first radio signal determines a size of a first transport block according to Section 5.1.3.2 in 3GPP TS38.214 (v2.0.0), the first transport block determines a number of bits included in the first code block according to Section 5.1 and Section 5.2 in 3GPP TS38.212 (v2.0.0), the first code block is obtained after the first transport block is processed sequentially through transport CRC addition, code block segmentation and code block CRC addition.

Embodiment 8

Figure 8:
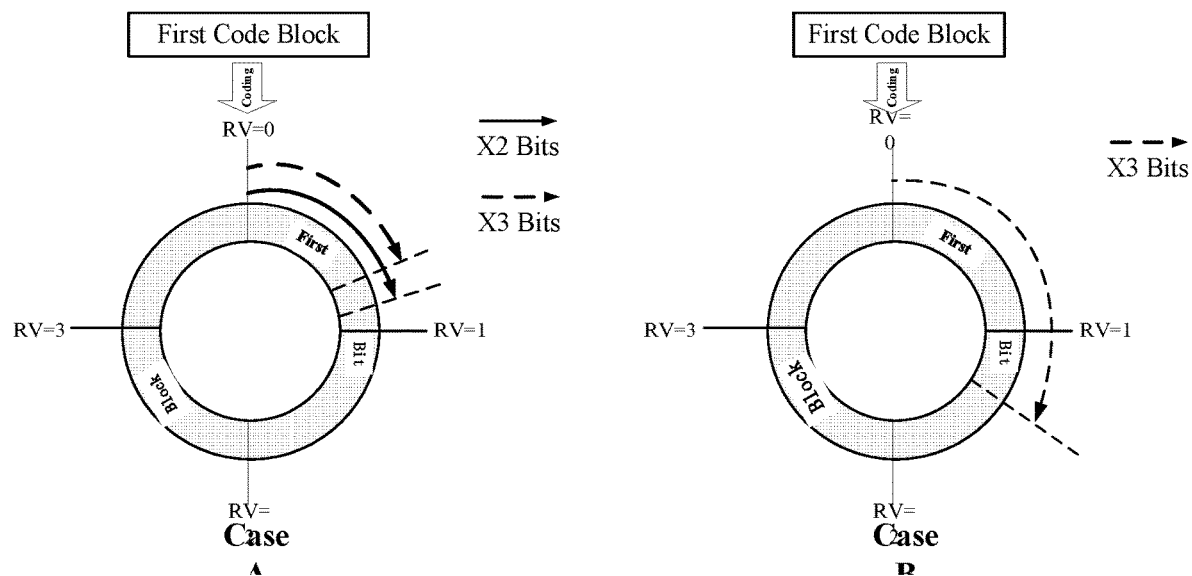
FIG. 8 is a diagram illustrating a relationship among a first bit block, X2 bits and X3 bits according to one embodiment of the disclosure.

Embodiment 8 illustrates a diagram of a relationship among a first bit block, X2 bits and X3 bits according to one embodiment of the disclosure, as shown in FIG. 8. In FIG. 8, a circular area filled with slashes represents a first bit block; in Case A, an area indicted by a solid arrow in the circular area represents X2 bits, and an area indicated by a dashed arrow in the circular area represents X3 bits; in Case B, an area indicated by a dashed arrow in the circular area represents X3 bits.

In Embodiment 8, the second signaling in the disclosure is used for determining X3 bits in the first bit block, and the X3 bits are used for generating the second radio signal in the disclosure; the X2 bits include the X3 bits (corresponding to Case A), or an RV corresponding to the X3 bits is equal to 0 (corresponding to Case B).

In one embodiment, a position of the X3 bits in the first bit block is related to a position of the X2 bits in the first bit block.

In one embodiment, a transmit start of the second radio signal is later than a transmission start of the first radio signal.

In one embodiment, a transmit start of the second radio signal is later than a transmission end of the first radio signal.

In one embodiment, the X3 bits are processed sequentially through rate matching, concatenation, scrambling, modulation mapper, layer mapper, precoding, resource element mapper and OFDM baseband signal generation to obtain the second radio signal.

In one embodiment, the X3 bits are processed sequentially through rate matching and concatenation with other bits to obtain a second bit block, and the second bit block is processed sequentially through scrambling, modulation mapper, layer mapper, precoding, resource element mapper and OFDM baseband signal generation to obtain the second radio signal.

In one embodiment, a bit other than the X3 bits is also used for generating the second radio signal.

In one embodiment, the second radio signal is generated by the X3 bit(s) only.

In one embodiment, the second radio signal is generated by the X3 bits and a bit other than the X3 bits.

In one embodiment, the second radio signal is a retransmission of a TB in one HARQ process.

In one embodiment, the first radio signal is a retransmission of one or more CBGs in one HARQ process.

In one embodiment, the first radio signal is a retransmission of a CB in one HARQ process.

In one embodiment, the X3 is less than a number of bits in the first bit block.

In one embodiment, the X3 is a positive integer not greater than the X2.

In one embodiment, the X3 is a positive integer greater than the X2.

In one embodiment, the X3 is equal to a number of bits in the first bit block.

In one embodiment, the X3 bits include all bits in the first bit block.

In one embodiment, the X3 bits include partial bits in the first bit block only.

In one embodiment, the first bit block is obtained as a sequential output of channel coding of the first code block, and the X3 bits are X3 consecutive bits in the first bit block.

In one embodiment, the first bit block is obtained as a sequential output of channel coding of the first code block, and the X3 bits are X3 discrete bits in the first bit block.

In one embodiment, the first bit block is obtained as a sequential output of channel coding of the first code block, and the X3 bits are X3 consecutive bits starting from the initial bit of the first bit block in the first bit block.

In one embodiment, the first bit block is obtained as a sequential output of channel coding of the first code block, and the X3 bits are X3 consecutive bits starting from the non-initial bit of the first bit block in the first bit block.

In one embodiment, any one of the X3 bits belongs to the X2 bits.

In one embodiment, the phrase that an RV corresponding to the X3 bits is equal to 0 refers that: the first bit block is a sequential output of channel coding of the first code block, and the X3 bits are X3 consecutive bits starting from an initial bit obtained according to an RV equal to 0 in the first bit block.

In one embodiment, the phrase that an RV corresponding to the X3 bits is equal to 0 refers that: the first bit block is a sequential output of channel coding of the first code block, and the X3 bits are X3 consecutive bits starting from an initial bit determined according to an RV equal to 0 in the first bit block during a rate matching process.

In one embodiment, the phrase that an RV corresponding to the X3 bits is equal to 0 refers that: the first bit block is a sequential output of channel coding of the first code block, and the X3 bits are X3 consecutive bits starting from an initial bit determined according to an RV equal to 0 in the first bit block, following the computation in Section 5.4.2 in 3GPP TS38.212 (v2.0.0).

Embodiment 9

Figure 9:
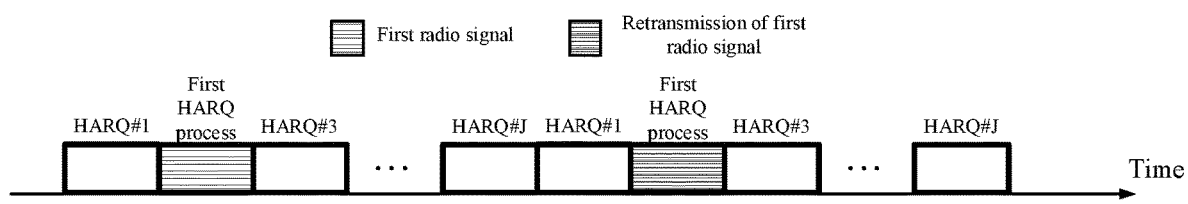
FIG. 9 is a diagram illustrating a first HARQ process according to one embodiment of the disclosure.

Embodiment 9 illustrates a diagram of a first HARQ process according to one embodiment of the disclosure, as shown in FIG. 9. In FIG. 9, the horizontal axis represents time, a rectangle filled with slashes represents a first radio signal belonging to a first HARQ process, and a rectangle filled with cross lines represents one retransmission of a first radio signal belonging to a first HARQ process.

In Embodiment 9, the first radio signal in the disclosure belongs to a first HARQ process, and the first information in the disclosure is used for determining a number of bits in the first HARQ process that can be used for decoding with combining.

In one embodiment, the first HARQ process belongs to one of Y HARQ processes, and the first information is used for determining a number of bits in each of the Y HARQ processes that can be used for decoding with combining.

In one embodiment, the phrase that the first radio signal belongs to the first HARQ process refers that: a process number assigned to the first radio signal is equal to a process number of the first HARQ process.

In one embodiment, the phrase that the first information is used for determining a number of bits in the first HARQ process that can be used for decoding with combining refers that: the first information is used by the first-type communication node to directly determine a number of bits in the first HARQ process that can be used for decoding with combining.

In one embodiment, the phrase that the first information is used for determining a number of bits in the first HARQ process that can be used for decoding with combining refers that: the first information is used by the first-type communication node to indirectly determine a number of bits in the first HARQ process that can be used for decoding with combining.

In one embodiment, the phrase that the first information is used for determining a number of bits in the first HARQ process that can be used for decoding with combining refers that: the first information indicates explicitly a number of bits in the first HARQ process that can be used for decoding with combining.

In one embodiment, the phrase that the first information is used for determining a number of bits in the first HARQ process that can be used for decoding with combining refers that: the first information indicates implicitly a number of bits in the first HARQ process that can be used for decoding with combining.

In one embodiment, the phrase that the first information is used for determining a number of bits in the first HARQ process that can be used for decoding with combining refers that: the first information is used for indicating a size of a soft buffer reserved for the first HARQ process by the first-type communication node, and a number of bits that can be buffered in the soft buffer reserved for the first HARQ process is equal to a number of bits in the first HARQ process that can be used for decoding with combining.

In one embodiment, the phrase that the first information is used for determining a number of bits in the first HARQ process that can be used for decoding with combining refers that: the first information is used for indicating a size of a soft buffer reserved for the first HARQ process by the first-type communication node, and the soft buffer reserved for the first HARQ process is used for determining a number of bits in the first HARQ process that can be used for decoding with combining.

In one embodiment, the first HARQ process belongs to one of Y HARQ processes, the first information is used for indicating a size of a soft buffer reserved for each of the Y HARQ processes by the first-type communication node, and the soft buffer reserved for each of the Y HARQ processes is used for determining a number of bits in the HARQ process that can be used for decoding with combining.

In one embodiment, the first HARQ process belongs to one of Y HARQ processes, the first information is used for indicating a size of a soft buffer reserved for each of the Y HARQ processes by the first-type communication node, and the size of the soft buffer reserved for each of the Y HARQ processes is equal to a number of bits in the HARQ process that can be used for decoding with combining.

In one embodiment, the phrase that the first information is used for determining a number of bits in the first HARQ process that can be used for decoding with combining refers that: the first information is used for indicating whether a number of bits in the first HARQ process that can be used for decoding with combining is equal to 0.

In one embodiment, the phrase that the first information is used for determining a number of bits in the first HARQ process that can be used for decoding with combining refers that: the first information is used for indicating whether soft bits in the first HARQ process can be flushed after one time of (successful or failed) reception.

In one embodiment, the first HARQ process belongs to one of Y HARQ processes, and the first information is used for indicating whether soft bits in each of the Y HARQ processes can be flushed after one time of (successful or failed) reception.

Embodiment 10

Embodiment 10 illustrates a diagram of a target MCS set according to one embodiment of the disclosure, as shown in FIG. 10. In FIG. 10, each row represents one MCS in a target MCS set, the first column represents an index of an MCS, the second column represents a modulation order, the third column represents a target code rate, the fourth column represents a spectral efficiency, and the bold-line row represents an MCS employed by the first radio signal.

In Embodiment 10, the first information in the disclosure is used for determining a target MCS set from P MCS sets, an MCS employed by the first radio signal in the disclosure is one MCS in the target MCS set, each of the P MCS sets includes a positive integer number of MCSs, any two of the P MCS sets are different, and the P is a positive integer greater than 1.

In one embodiment, each of the P MCS sets corresponds to one MCS table.

In one embodiment, one MCS includes a combination of one modulation order, one target code rate and one spectral efficiency.

In one embodiment, the phrase that two MCS sets are different refers that: one MCS belongs to only one of the two MCS sets.

In one embodiment, respective MCSs included in a Table 5.1.3.1-1 and a Table 5.1.3.1-2 in 3GPP TS38.214 constitute a first MCS set and a second MCS set respectively, the first MCS set and the second MCS set belong to two of the P MCS sets, and one of the P MCS set is different from both the first MCS set and the second MCS set, and the P is greater than 2.

Embodiment 11

Embodiment 11 illustrates a diagram of a channel quality measured based on a first threshold according to one embodiment of the disclosure, as shown in FIG. 11. In FIG. 11, each row represents one state of a measured Channel Quality Indicator (CQI), the first column represents an index of a CQI, the second column represents a modulation scheme, the third column represents a code rate and the fourth column represents an efficiency.

In Embodiment 11, the first information in the disclosure is used for determining a first threshold, a probability that a transport block carried by the first radio signal in the disclosure is erroneously decoded does not exceed the first threshold, the first threshold is a positive real number, the second information in the disclosure is used for indicating a channel quality measured based on the first threshold.

In one embodiment, the first threshold is less than 0.1.

In one embodiment, the first threshold is greater than 0.1.

In one embodiment, the first threshold is equal to 0.1.

In one embodiment, the first threshold is not equal to an existing (3GPP R15) target block error rate.

In one embodiment, the first threshold is not equal to any one value in IE 'BLER-target' in existing 3GPP TS 38.331 (Release 15).

In one embodiment, the first threshold is equal to one value in IE 'BLER-target' in existing 3GPP TS 38.331 (Release 15).

In one embodiment, the channel quality is indicated through a CQI.

Embodiment 12

Figure 12:
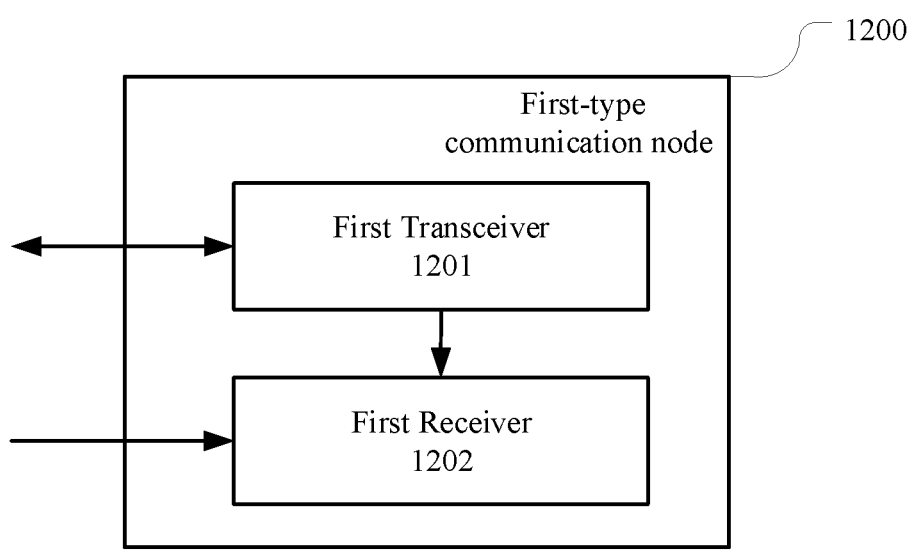
FIG. 12 is a structure block diagram illustrating a processing device in a first-type communication node according to one embodiment of the disclosure.

Embodiment 12 illustrates a structure block diagram of a processing device in a first-type communication node, as shown in FIG. 12. In FIG. 12, the processing device 1200 in the first-type communication node includes a first transceiver 1201 and a first receiver 1202. The first transceiver 1201 includes the transmitter/receiver 456 (including antenna 460), the receiving processor 452, the transmitting processor 455 and the controller/processor 490 illustrated in FIG. 4 in the disclosure; the first receiver 1202 includes the transmitter/receiver 456 (including antenna 460), the receiving processor 452 and the controller/processor 490 illustrated in FIG. 4 in the disclosure.

In Embodiment 12, the first transceiver 1201 receives first information; the first receiver 1202 receives a first radio signal; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

In one embodiment, the first transceiver 1201 further receives a first signaling; the first signaling is used for indicating time-frequency resources occupied by the first radio signal, a number of resource elements included in the time-frequency resources occupied by the first radio signal is used for determining a number of bits included in the first code block, and the first signaling is transmitted through the air interface.

In one embodiment, the first transceiver 1201 further receives a second signaling; the first receiver 1202 further receives a second radio signal; the second signaling is used for determining X3 bit(s) in the first bit block, and the X3 bit(s) is(are) used for generating the second radio signal; the X2 bit(s) include(s) the X3 bit(s), or a redundancy version corresponding to the X3 bit(s) is equal to 0; the second signaling and the second radio signal are transmitted through the air interface.

In one embodiment, the first radio signal belongs to a first HARQ process, and the first information is used for determining a number of bits in the first HARQ process that can be used for decoding with combining.

In one embodiment, the first bit block is obtained as a sequential output of channel coding of the first code block, the X2 bit(s) is(are) X2 consecutive bits in the first bit block, and a start position of the X2 bit(s) in the first bit block is predefined.

In one embodiment, the first information is used for determining a target MCS set from P MCS sets, an MCS employed by the first radio signal is one MCS in the target MCS set, each of the P MCS sets includes a positive integer number of MCSs, any two of the P MCS sets are different, and the P is a positive integer greater than 1.

In one embodiment, the first transceiver 1201 further transmits second information; the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

Embodiment 13

Figure 13:
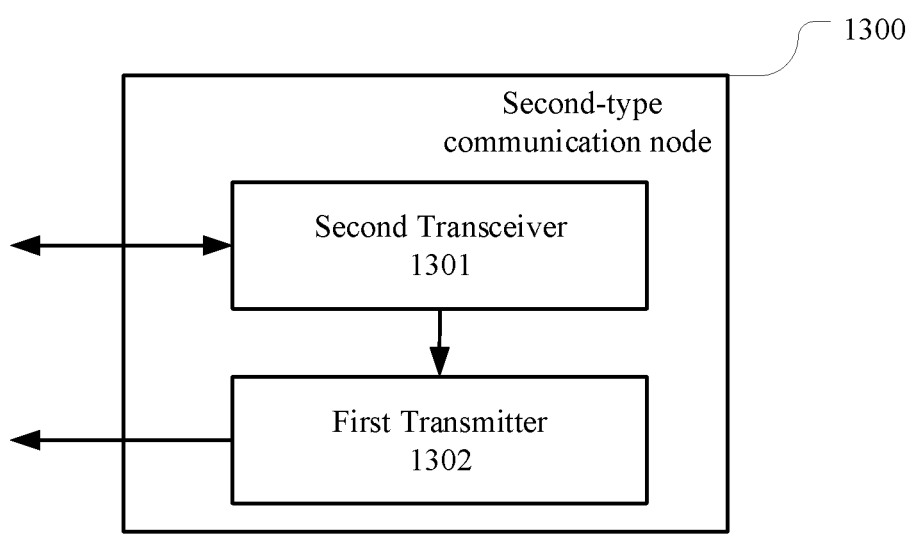
FIG. 13 is a structure block diagram illustrating a processing device in a second-type communication node according to one embodiment of the disclosure.

Embodiment 13 illustrates a structure block diagram of a processing device in a second-type communication node, as shown in FIG. 13. In FIG. 13, the processing device in the second-type communication node includes a second transceiver 1301 and a first transmitter 1302. The second transceiver 1301 includes the transmitter/receiver 416 (including antenna 420), the transmitting processor 415, the receiving processor 412 and the controller/processor 440 illustrated in FIG. 4 in the disclosure; and the first transmitter 1302 includes the transmitter/receiver 416 (including antenna 420), the transmitting processor 415 and the controller/processor 440 illustrated in FIG. 4 in the disclosure.

In Embodiment 13, the second transceiver 1301 transmits first information; the first transmitter 1302 transmit a first radio signal; herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

In one embodiment, the second transceiver 1301 further transmits a first signaling; the first signaling is used for indicating time-frequency resources occupied by the first radio signal, a number of resource elements included in the time-frequency resources occupied by the first radio signal is used for determining a number of bits included in the first code block, and the first signaling is transmitted through the air interface.

In one embodiment, the second transceiver 1301 further transmits a second signaling; the first transmitter 1302 further transmits a second radio signal; the second signaling is used for determining X3 bit(s) in the first bit block, and the X3 bit(s) is(are) used for generating the second radio signal; the X2 bit(s) include(s) the X3 bit(s), or a redundancy version corresponding to the X3 bit(s) is equal to 0; the second signaling and the second radio signal are transmitted through the air interface.

In one embodiment, the first radio signal belongs to a first HARQ process, and the first information is used for determining a number of bits in the first HARQ process that can be used for decoding with combining.

In one embodiment, the first bit block is obtained as a sequential output of channel coding of the first code block, the X2 bit(s) is(are) X2 consecutive bits in the first bit block, and a start position of the X2 bit(s) in the first bit block is predefined.

In one embodiment, the first information is used for determining a target MCS set from P MCS sets, an MCS employed by the first radio signal is one MCS in the target MCS set, each of the P MCS sets includes a positive integer number of MCSs, any two of the P MCS sets are different, and the P is a positive integer greater than 1.

In one embodiment, the second transceiver 1301 further receives second information; the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first-type communication node or UE or terminal in the disclosure in the disclosure includes but not limited to mobile phones, tablet computers, notebooks, network cards, low-power equipment, enhanced MTC (eMTC) equipment, NB-IOT equipment, vehicle-mounted communication equipment, aircrafts, airplanes, unmanned aerial vehicles, telecontrolled aircrafts, and other radio communication equipment. The second-type communication node or base station or network side equipment in the disclosure includes but not limited to macro-cellular base stations, micro-cellular base stations, home base stations, relay base stations, eNBs, gNBs, TRPs, relay satellites, satellite base stations, air base stations and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first-type communication node for wireless communications, comprising:
   receiving first information; and
   receiving a first radio signal;
   wherein only X1 bit(s) in a first bit block is(are) used for generating the first radio signal, the first bit block is obtained as an output of channel coding of a first code block, the first code block comprises a positive integer number of bit(s), and the first bit block comprises a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

2. The method according to claim 1, further comprising:
   receiving a first signaling;
   wherein the first signaling is used for indicating time-frequency resources occupied by the first radio signal, a number of resource elements included in the time-frequency resources occupied by the first radio signal is used for determining a number of bits included in the first code block, and the first signaling is transmitted through the air interface; the first radio signal belongs to a first HARQ process, and the first information is used for determining a number of bits in the first HARQ process that can be used for decoding with combining.

3. The method according to claim 1, further comprising:
   receiving a second signaling; and
   receiving a second radio signal;
   wherein the second signaling is used for determining X3 bit(s) in the first bit block, and the X3 bit(s) is(are) used for generating the second radio signal; the X2 bit(s) comprise(s) the X3 bit(s), or a redundancy version corresponding to the X3 bit(s) is equal to 0; the second signaling and the second radio signal are transmitted through the air interface.

4. The method according to claim 1, wherein the first information is used for determining a target Modulation Coding Scheme (MCS) set from P MCS sets, an MCS employed by the first radio signal is one MCS in the target MCS set, each of the P MCS sets comprises a positive integer number of MCSs, any two of the P MCS sets are different, and the P is a positive integer greater than 1.

5. The method according to claim 1, further comprising:
   transmitting second information;
   wherein the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

6. A method in a second-type communication node for wireless communications, comprising:
   transmitting first information; and
   transmitting a first radio signal;
   wherein only X1 bit(s) in a first bit block is(are) used for generating the first radio signal, the first bit block is obtained as an output of channel coding of a first code block, the first code block comprises a positive integer number of bit(s), and the first bit block comprises a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

7. The method according to claim 6, further comprising: transmitting a first signaling;
wherein the first signaling is used for indicating time-frequency resources occupied by the first radio signal, a number of resource elements included in the time-frequency resources occupied by the first radio signal is used for determining a number of bits included in the first code block, and the first signaling is transmitted through the air interface; the first radio signal belongs to a first HARQ process, and the first information is used for determining a number of bits in the first HARQ process that can be used for decoding with combining.

8. The method according to claim 6, further comprising: transmitting a second signaling; and
transmitting a second radio signal;
wherein the second signaling is used for determining X3 bit(s) in the first bit block, and the X3 bit(s) is(are) used for generating the second radio signal; the X2 bit(s) comprise(s) the X3 bit(s), or a redundancy version corresponding to the X3 bit(s) is equal to 0; the second signaling and the second radio signal are transmitted through the air interface.

9. The method according to claim 6, wherein the first information is used for determining a target MCS set from P MCS sets, an MCS employed by the first radio signal is one MCS in the target MCS set, each of the P MCS sets comprises a positive integer number of MCSs, any two of the P MCS sets are different, and the P is a positive integer greater than 1.

10. The method according to claim 6, further comprising: receiving second information;
wherein the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

11. A first-type communication node for wireless communications, comprising:
a first transceiver, to receive first information; and
a first receiver, to receive a first radio signal;
wherein only X1 bit(s) in a first bit block is(are) used for generating the first radio signal, the first bit block is obtained as an output of channel coding of a first code block, the first code block comprises a positive integer number of bit(s), and the first bit block comprises a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

12. The first-type communication node according to claim 11, wherein the first transceiver receives a first signaling; the first signaling is used for indicating time-frequency resources occupied by the first radio signal, a number of resource elements included in the time-frequency resources occupied by the first radio signal is used for determining a number of bits included in the first code block, and the first signaling is transmitted through the air interface; the first radio signal belongs to a first HARQ process, and the first information is used for determining a number of bits in the first HARQ process that can be used for decoding with combining.

13. The first-type communication node according to claim 11, wherein the first transceiver receives a second signaling; the first receiver receives a second radio signal; the second signaling is used for determining X3 bit(s) in the first bit block, and the X3 bit(s) is(are) used for generating the second radio signal; the X2 bit(s) comprise(s) the X3 bit(s), or a redundancy version corresponding to the X3 bit(s) is equal to 0; the second signaling and the second radio signal are transmitted through the air interface.

14. The first-type communication node according to claim 11, wherein the first information is used for determining a target MCS set from P MCS sets, an MCS employed by the first radio signal is one MCS in the target MCS set, each of the P MCS sets comprises a positive integer number of MCSs, any two of the P MCS sets are different, and the P is a positive integer greater than 1.

15. The first-type communication node according to claim 11, wherein the first transceiver transmits second information; the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

16. A second-type communication node for wireless communications, comprising:
a second transceiver, to transmit first information; and
a first transmitter, to transmit a first radio signal;
wherein only X1 bit(s) in a first bit block is(are) used for generating the first radio signal, the first bit block is obtained as an output of channel coding of a first code block, the first code block comprises a positive integer number of bit(s), and the first bit block comprises a positive integer number of bit(s); when channel decoding fails, at least X2 bit(s) in the first bit block can be used for decoding of the first code block with combining, the first information is used for determining the X2 bit(s), and the X2 is a positive integer; or, the first information is used for determining that the X1 bit(s) cannot be used for decoding of the first code block with combining when channel decoding fails; the first information and the first radio signal are both transmitted through an air interface.

17. The second-type communication node according to claim 16, wherein the second transceiver transmits a first signaling; the first signaling is used for indicating time-frequency resources occupied by the first radio signal, a number of resource elements included in the time-frequency resources occupied by the first radio signal is used for determining a number of bits included in the first code block, and the first signaling is transmitted through the air interface; the first radio signal belongs to a first HARQ process, and the first information is used for determining a number of bits in the first HARQ process that can be used for decoding with combining.

18. The second-type communication node according to claim 16, wherein the second transceiver transmits a second signaling; the first transmitter transmits a second radio signal; the second signaling is used for determining X3 bit(s) in the first bit block, and the X3 bit(s) is(are) used for generating the second radio signal; the X2 bit(s) comprise(s) the X3 bit(s), or a redundancy version corresponding to the X3 bit(s) is equal to 0; the second signaling and the second radio signal are transmitted through the air interface.

19. The second-type communication node according to claim 16, wherein the first information is used for determining a target MCS set from P MCS sets, an MCS employed by the first radio signal is one MCS in the target MCS set, each of the P MCS sets comprises a positive integer number of MCSs, any two of the P MCS sets are different, and the P is a positive integer greater than 1.

20. The second-type communication node according to claim 16, wherein the second transceiver receives second information; the first information is used for determining a first threshold, a probability that a transport block carried by the first radio signal is erroneously decoded does not exceed the first threshold, the first threshold is a positive real number, the second information is used for indicating a channel quality measured based on the first threshold, and the second information is transmitted through the air interface.

\* \* \* \* \*